(12) United States Patent
Higuchi et al.

(10) Patent No.: US 10,449,900 B2
(45) Date of Patent: Oct. 22, 2019

(54) VIDEO SYNTHESIS SYSTEM, VIDEO SYNTHESIS DEVICE, AND VIDEO SYNTHESIS METHOD

(71) Applicant: CLARION CO., LTD., Saitama-shi, Saitama (JP)

(72) Inventors: Haruhiko Higuchi, Tokyo (JP); Kenta Takanohashi, Tokyo (JP); Mitsuo Nakajima, Tokyo (JP); Hidenori Sakaniwa, Tokyo (JP); Yoshitaka Uchida, Saitama (JP); Hiroyuki Nakamura, Saitama (JP); Katsuo Onozaki, Saitama (JP); Takayuki Shioya, Saitama (JP)

(73) Assignee: CLARION, CO., LTD., Saitama (JP)

( * ) Notice: Subject to any disclaimer, the term of this patent is extended or adjusted under 35 U.S.C. 154(b) by 335 days.

(21) Appl. No.: 15/317,001

(22) PCT Filed: Jun. 15, 2015

(86) PCT No.: PCT/JP2015/067169
§ 371 (c)(1),
(2) Date: Dec. 7, 2016

(87) PCT Pub. No.: WO2015/194501
PCT Pub. Date: Dec. 23, 2015

(65) Prior Publication Data
US 2017/0096106 A1    Apr. 6, 2017

(30) Foreign Application Priority Data

Jun. 20, 2014   (JP) ................................ 2014-127565

(51) Int. Cl.
*B60R 1/00*    (2006.01)
*B60R 21/00*   (2006.01)
(Continued)

(52) U.S. Cl.
CPC ............... *B60R 1/00* (2013.01); *B60R 21/00* (2013.01); *G06K 9/00711* (2013.01);
(Continued)

(58) Field of Classification Search
CPC .............. G06T 3/00; G06T 11/60; B60R 1/00
See application file for complete search history.

(56) References Cited

U.S. PATENT DOCUMENTS 7,266,219 B2 *   9/2007   Okamoto ................... B60R 1/00
                                                      340/901
7,663,476 B2 *   2/2010   Watanabe .............. B60Q 9/005
                                                      340/435

(Continued)

FOREIGN PATENT DOCUMENTS

EP      2482557 A1    8/2012
EP      2733937 A1    5/2014

(Continued)

OTHER PUBLICATIONS

Omnidirectional active vision for evolutionary car driving; Suzuki; 2006. (Year: 2006).*

(Continued)

*Primary Examiner* — Luis Perez-Fuentes
(74) *Attorney, Agent, or Firm* — Volpe and Koenig, P.C.

(57) ABSTRACT

A video display system performs a video conversion process on a video of a camera mounted on a vehicle and displays a resulting video, and includes a plurality of cameras, a detecting unit that detects an object of interest around the vehicle based on information or the like acquired through the plurality of cameras, other sensors, or a network, a transforming/synthesizing unit that transforms and synthesizes the videos photographed by the plurality of cameras using a shape of a virtual projection plane, a virtual viewpoint, and a synthesis method which are decided according to (Continued)

to position information of the object of interest detected by the detecting unit, and a display unit that displays the video that is transformed and synthesized by the transforming/synthesizing unit.

10 Claims, 17 Drawing Sheets

(51) Int. Cl.
| | |
|---|---|
| G08G 1/16 | (2006.01) |
| G06T 7/73 | (2017.01) |
| G06K 9/00 | (2006.01) |
| G06T 5/00 | (2006.01) |
| G06T 11/60 | (2006.01) |
| H04N 5/232 | (2006.01) |
| H04N 7/18 | (2006.01) |
| G06T 3/00 | (2006.01) |
| H04N 5/247 | (2006.01) |
| H04N 13/111 | (2018.01) |
| H04N 13/00 | (2018.01) |
| H04N 13/243 | (2018.01) |
| G06K 9/36 | (2006.01) |

(52) U.S. Cl.
CPC .......... *G06K 9/00805* (2013.01); *G06T 3/005* (2013.01); *G06T 5/002* (2013.01); *G06T 7/74* (2017.01); *G06T 11/60* (2013.01); *G08G 1/16* (2013.01); *H04N 5/23293* (2013.01); *H04N 5/247* (2013.01); *H04N 7/181* (2013.01); *H04N 13/111* (2018.05); *B60R 2300/105* (2013.01); *B60R 2300/205* (2013.01); *B60R 2300/303* (2013.01); *B60R 2300/80* (2013.01); *G06K 2009/363* (2013.01); *G06T 2207/10016* (2013.01); *G06T 2207/30261* (2013.01); *H04N 13/243* (2018.05); *H04N 2013/0088* (2013.01)

(56) References Cited

U.S. PATENT DOCUMENTS

| | | | |
|---|---|---|---|
| 9,467,679 B2* | 10/2016 | Wakabayashi | ......... G08G 1/168 |
| 2003/0011597 A1 | 1/2003 | Oizumi | |
| 2006/0088190 A1* | 4/2006 | Chinomi | .................. B60R 1/00 |
| | | | 382/104 |
| 2008/0204557 A1* | 8/2008 | Kubota | ..................... B60R 1/00 |
| | | | 348/148 |
| 2010/0118122 A1 | 5/2010 | Hartman | |

FOREIGN PATENT DOCUMENTS

| | | |
|---|---|---|
| JP | 2008-149878 A | 7/2008 |
| JP | 2009-171537 A | 7/2009 |
| JP | 2009-232310 A | 10/2009 |
| JP | 2012-138660 A | 7/2012 |
| JP | 2014-090349 A | 5/2014 |
| WO | 2013/053589 A1 | 4/2013 |
| WO | 2015/002031 A1 | 1/2015 |

OTHER PUBLICATIONS

Total vision camera systems; 2010 (Year: 2010).*
Communication pursuant to Article 94(3) EPC dated Feb. 20, 2019 for European Patent Application No. 15809516.6.

* cited by examiner

F I G. 2 A
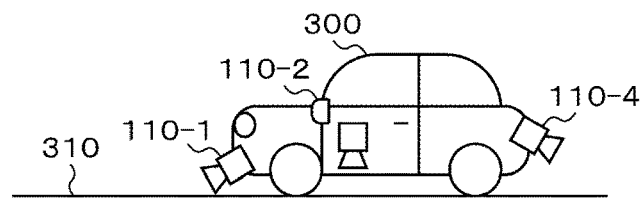
F I G. 2 B
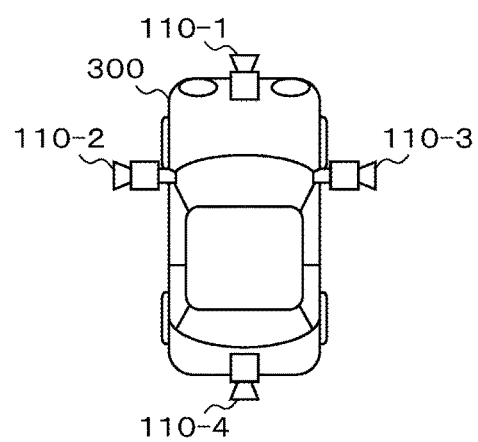
F I G. 2 C
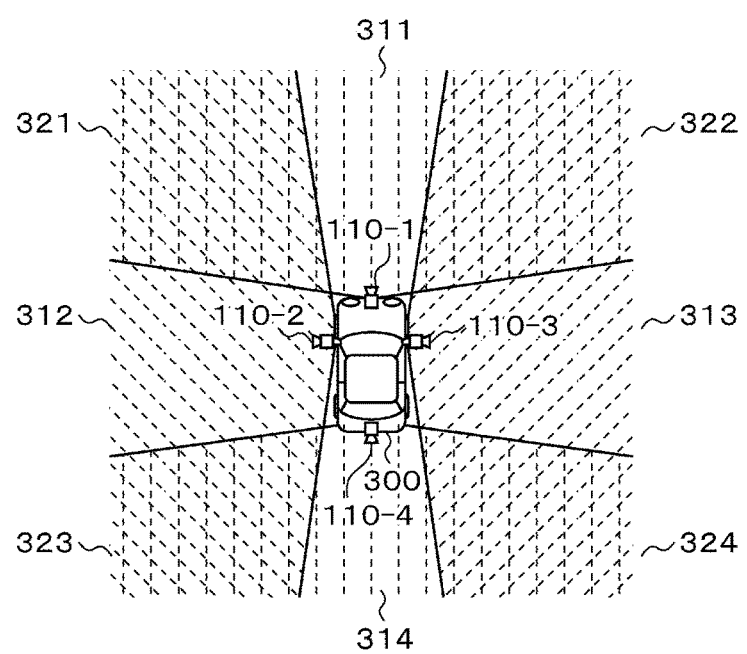

F I G. 7
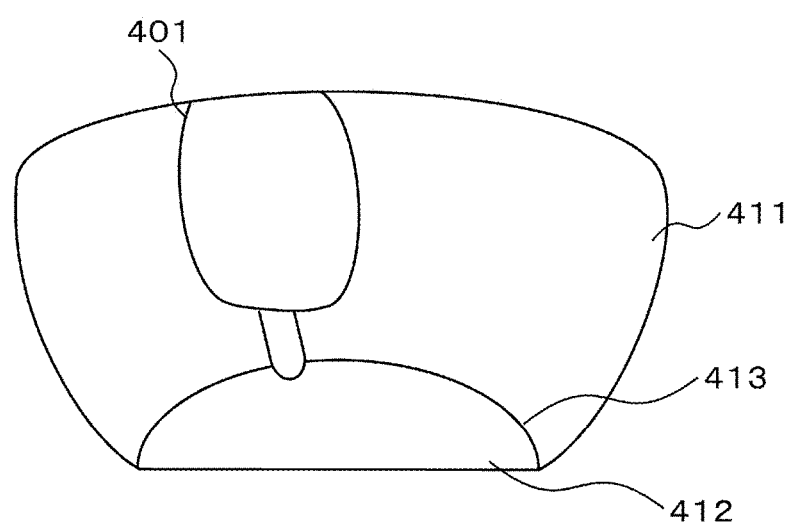

F I G. 10
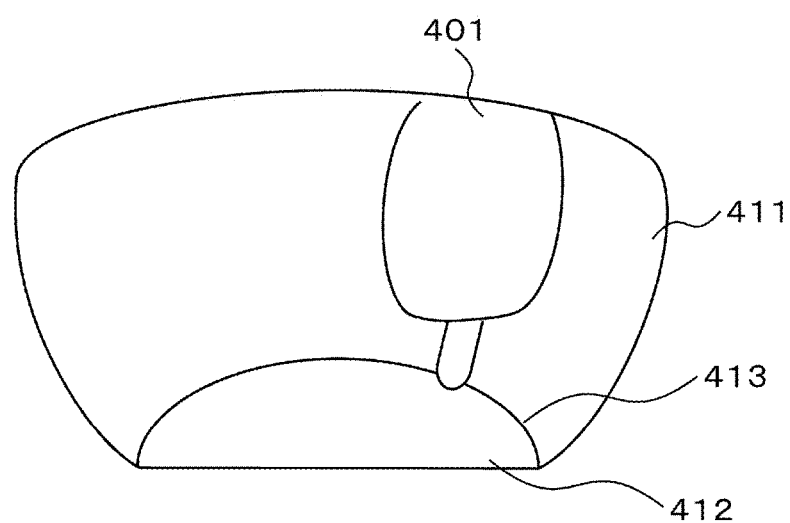

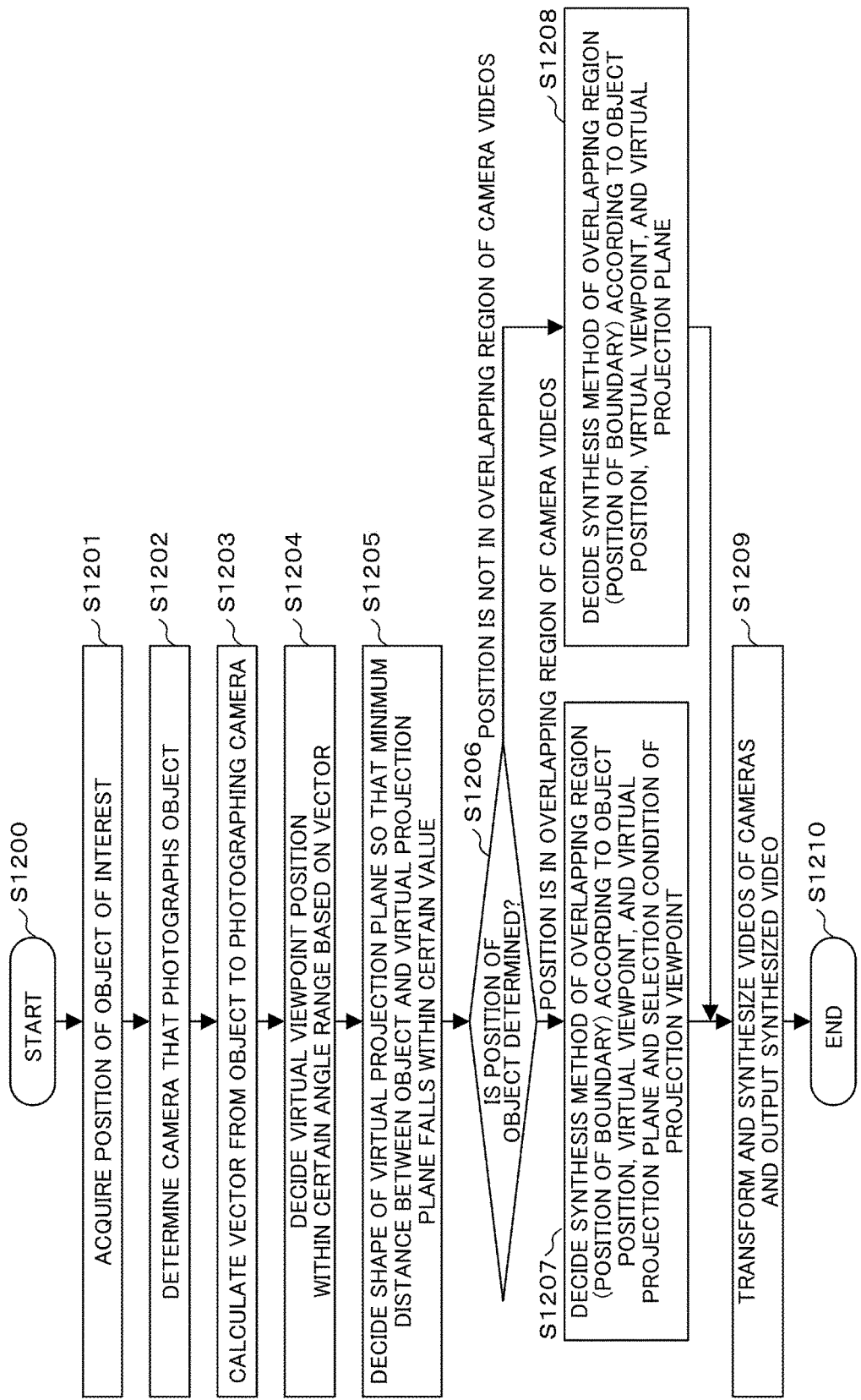

VIDEO SYNTHESIS SYSTEM, VIDEO SYNTHESIS DEVICE, AND VIDEO SYNTHESIS METHOD

TECHNICAL FIELD

The present invention relates to a video synthesis device and a video display device which are capable of transforming and synthesizing videos photographed by one or more cameras and causing a resulting video to be displayed on a display device.

BACKGROUND ART

A system of photographing an area around a vehicle through a plurality of cameras installed in the vehicle and displaying a video in the vehicle so that a driver can check the area around the vehicle while driving the vehicle has been already proposed, and such a known system also includes a technique of displaying a video in which the area around the vehicle is viewed from a virtual viewpoint by appropriately transforming and synthesizing the videos photographed by a plurality of cameras installed in the vehicle.

In such a video display system, a technique of arranging a projection plane on a virtual space, mapping a camera video, creating a video viewed from a virtual viewpoint in the space, and displaying the video is known. In this case, it is common that, when a difference occurs in a shape between a subject photographed by the camera and the virtual projection plane, a video that is transformed and synthesized is viewed to be distorted due to the difference. For example, when the subject photographed by the camera is a three-dimensional (3D) object such as a person or a guardrail, and the virtual projection plane is a plane that is equal in height to the ground surface and parallel to the ground surface, the 3D object is distorted to be an elongated video in a video that is transformed and synthesized, and thus the user is unable to understand a situation. In order to solve such a problem, various techniques regarding a method of generating a video that is transformed and synthesized have been disclosed in the past.

For example, Patent Document 1 discloses a technique of changing a shape of a virtual projection plane and a position and an angle of a virtual viewpoint according to a state of a vehicle.

CITATION LIST

Patent Document

Patent Document 1: JP 2009-171537 A

SUMMARY OF THE INVENTION

Problems to be Solved by the Invention

In other words, in Patent Document 1, a technique of changing a display video together with a driving scene by dynamically changing the shape of the virtual projection plane according to the state of the vehicle or an object around the vehicle is disclosed, but a specific countermeasure for reducing distortion of a specific subject when the subject is desired to be noticeably displayed is not disclosed, and thus there still remains a problem in that the subject is displayed to be distorted in the video that is transformed and synthesized.

In this regard, the present invention was made to solve the problems in the related arts, and it is an object of the present invention to provide a video display system, a video synthesis device, and a video synthesis method, which are capable of reducing, even when a specific subject is desired to be noticeably displayed, distortion of the subject and creating an image for displaying an object of interest more naturally.

Solutions to Problems

In order to achieve the above object, according to the present invention, as an example, as stated in claims set forth below, first, provided is a video display system that includes an imaging unit including a plurality of cameras, a video synthesis device that synthesizes a plurality of videos input from the plurality of cameras of the imaging unit, and a video display unit that displays a video synthesized by the video synthesis device, the video synthesis device includes a detecting unit that detects an object of interest based on the video input from the imaging unit, a transforming/synthesizing unit that transforms and synthesizes a plurality of videos photographed by the plurality of cameras of the imaging unit, and an operation processing device that controls at least operations of the detecting unit and the transforming/synthesizing unit, and the operation processing device transforms and synthesizes the videos photographed by the plurality of cameras so that distortion of the object of interest is reduced using a virtual projection plane, a virtual viewpoint, and a synthesis method decided according to information related to the object of interest detected by the detecting unit through the transforming/synthesizing unit, and causes a resulting video to be displayed on the video display unit.

Further, in order to achieve the above object, according to the present invention, provided is a video synthesis device that receives a plurality of videos from a plurality of cameras, transforms and synthesizes the videos, and causes a resulting video to be displayed on a video display unit, and includes a detecting unit that detects an object of interest based on the videos input from the imaging unit, a transforming/synthesizing unit that transforms and synthesizes the plurality of videos photographed by the plurality of cameras of the imaging unit, and an operation processing device that controls at least operations of the detecting unit and the transforming/synthesizing unit, and the operation processing device transforms and synthesizes the videos photographed by the plurality of cameras so that distortion of the object of interest is reduced using a virtual projection plane, a virtual viewpoint, and a synthesis method decided according to information related to the object of interest detected by the detecting unit through the transforming/synthesizing unit, and causes a resulting video to be displayed on the video display unit.

Further, in order to achieve the above object, according to the present invention, provided is a video synthesis method of receiving a plurality of videos from a plurality of cameras, synthesizing the videos, and causes a synthesized video to be displayed on a video display unit, and includes transforming and synthesizing the videos photographed by the plurality of cameras so that distortion of the object of interest is reduced using a virtual projection plane, a virtual viewpoint, and a synthesis method decided according to information related to the object of interest detected by the detecting unit and causing a resulting video to be displayed on the video display unit.

Effects of the Invention

According to the present invention, it is an effect in that it is possible to provide a video display system, a video synthesis device, and a video synthesis method, which are capable of creating an image for displaying an object of interest more naturally.

BRIEF DESCRIPTION OF THE DRAWINGS

FIGS. 2A and 2B are a left side view and a plane view illustrating exemplary installation of an in-vehicle camera in the video display system, and FIG. 2C is a diagram illustrating an angle of view of the -vehicle camera and an overlapping region of a photographing range.

FIG. 7 is a diagram illustrating a video viewed from a virtual viewpoint when a setting of FIGS. 6A and 6B is performed in a photographing camera.

FIG. 10 is a diagram illustrating a video viewed from a virtual viewpoint at the time of setting of FIG. 9.

FIG. 12 is a flowchart illustrating a process of deciding a method of deciding a virtual projection plane and a virtual viewpoint and a synthesis method of a camera video according to a position of an object of interest in the video display system.

MODE FOR CARRYING OUT THE INVENTION

Hereinafter, exemplary embodiments of the present invention will be described in detail with reference to the appended drawings.

Figure 1:
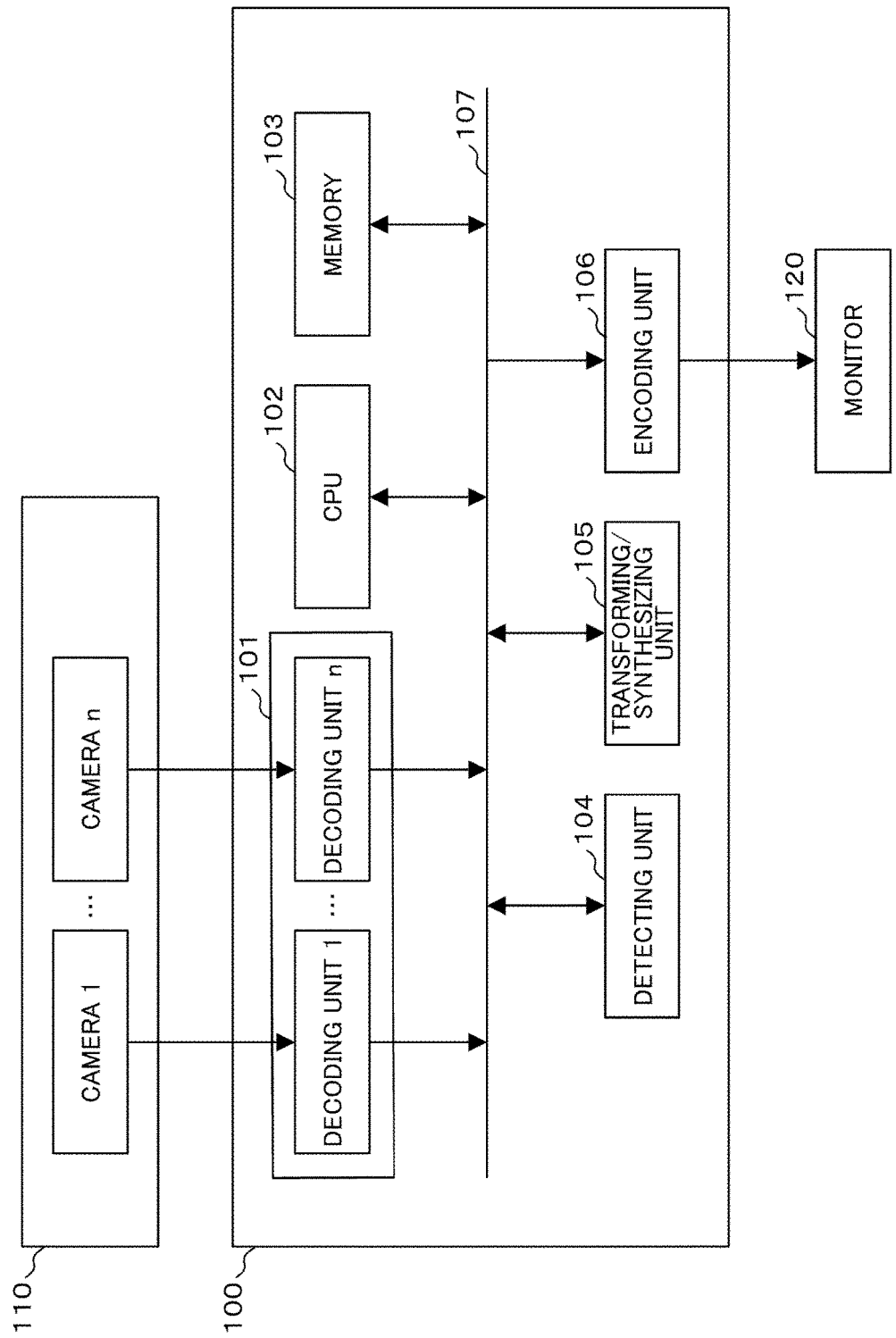
FIG. 1 is a block diagram illustrating an example of configurations of a video synthesis device and a video display system according to an embodiment of the present invention.

FIG. 1 is a block diagram illustrating an example of an overall configuration of a video display system according to the present embodiment. Referring to FIG. 1, the video display system basically includes a video synthesis device 100, an imaging unit 110 including a plurality of cameras (n cameras) that image a subject, and a monitor 120 that displays an image. In this configuration, a configuration in which videos photographed by a plurality of cameras constituting the imaging unit 110 is transformed and synthesized by the video synthesis device 100 and then output to the monitor 120 is similar to a common video display system.

Here, first, for a plurality of cameras constituting the imaging unit 110, in the present embodiment, for example, four cameras 110-1 to 110-4 are installed on front and rear sides and left and right sides of an automobile 300 as illustrated in FIGS. 2A to 2C, and an example in which the video display system according to the present invention is applied to a vehicle will be described below. However, the present invention is not limited thereto and may be applied to any other system that displays photographed images of a plurality of monitoring cameras. In the drawings, reference numeral 310 denotes the ground surface.

Referring back to FIG. 1, the video synthesis device 100 includes a decoding unit 101, a central control unit (CPU) 102, a memory 103, a detecting unit 104, a transforming/synthesizing unit 105, an encoding unit 106, and a bus 107. Hereinafter, processes in the respective units will be described.

The decoding unit 101 converts video signals input from a plurality of cameras 110-1 to 110-4 of the imaging unit 110 into information necessary for transformation and synthesis of an image such as quantization data.

The CPU 102 controls an operation of the device in general, and decides a method of synthesizing a shape of a virtual projection plane and a virtual viewpoint necessary for an image conversion process based on a position of an object of interest detected or determined by the detecting unit 104 which will be described later.

Each unit connected to the bus 107 writes or reads information necessary for video synthesis in or from the memory 103. Example of information stored in the memory 103 include image data that is input from the decoding unit 101 and temporarily stored before image conversion, position information of an object of interest detected by the detecting unit 104, and image data that is converted by the transforming/synthesizing unit 105 and temporarily stored. There are cases in which the transforming/synthesizing unit 105 or the detecting unit 104 is implemented by software. In this case, the function of the transforming/synthesizing unit 105 or the detecting unit 104 may be implemented such that the CPU 102 reads a program stored in a storage unit (not illustrated) out to the memory 103, and performs an operation according to the program.

The detecting unit 104 has a function of detecting or determining a position of a target or a certain range which is to be noticeably displayed among all videos photographed by the cameras 110-1 to 110-4 of the imaging unit 110. Here, the "object of interest" is assumed to include a certain range considered to be risky in terms of driving such as a right front area when taking a right turn in an intersection or a behind area when going backward in addition to a 3D object such as a pedestrian, a vehicle that is traveling excluding a subject vehicle, a guardrail, or a building.

As a method of detecting or determining the object of interest, for example, in addition to the detecting unit 104, a feature quantity detection processing unit that detects a feature quantity from a camera video input through the decoding unit 101 and detecting a relative position to a camera position may be provided, or a distance measuring unit that detects a rough direction or distance from its own vehicle through one or more sonars or a laser distance meter may be used together. Alternatively, a communication processing unit that acquires information of a global positioning system (GPS) or an intelligent transport system (ITS), or the like may be provided, and the detecting unit may determine a relative position between its own vehicle and an object of interest based on the information acquired by the communication processing unit. Further, when a plurality of objects are detected around a vehicle, a controller area network (CAN) information acquiring unit that acquires vehicle information such as a traveling direction, a vehicle speed, or a steering angle of a vehicle obtained through a CAN (a communication unit) may be provided, a direction in which a vehicle travels may be estimated based on the information, and an object in the direction may be determined to be an object having a high collision possibility and determined to be an object of interest by the detecting unit 104. Further, when a plurality of objects are detected around a vehicle, an object closest to a vehicle may be determined to be an object of interest, and a video may be generated. Here, information such as a relative position of an object of interest on a plane view with respect to its own vehicle or a mounting position of each camera may be used as information to be detected or determined, and particularly, more detailed information such as a height or a 3D shape of a 3D object may be used in order to improve an image conversion accuracy of an object of interest. Through this method, it is possible to appropriately give a presentation to the user focusing on an object around a vehicle or an object serving as an obstacle in traveling of a vehicle. The detecting unit 104, the feature quantity detection processing unit, distance measuring unit, the communication processing unit, the CAN information acquiring unit, and the like have a common aspect in which they acquire information related to an object of interest and can be included in the video synthesis device 100 as one processing unit (an object-of-interest information acquiring unit) having one or more functions of these processing units.

Further, when a device capable of acquiring the information related to the object of interest is included in a vehicle separately from the video synthesis device 100, the video synthesis device 100 may include an interface that performs communication with the device and acquires the information related to the object of interest, and in this case, the same function can be implemented although the detecting unit 104 is not provided.

The transforming/synthesizing unit 105 performs a transformation process and a synthesis process on images input from the cameras of the imaging unit 110 via the decoding unit 101. The transformation process and the synthesis process will be described later with reference to FIG. 3. At this time, the images photographed by the cameras 110-1 to 110-4 of the imaging unit 110 are projected onto an object plane generated in a 3D space as the virtual projection plane and converted into images viewed from the virtual viewpoint, and the images of the n cameras are further synthesized. As described above, when the images of the cameras 110-1 to 110-4 are transformed by the transforming/synthesizing unit 105, the transformed images have a certain overlapping region, and a blend synthesis process is performed on the overlapping region through a blending which will be described later.

The encoding unit 106 converts an image transformed and synthesized by the transforming/synthesizing unit 105 into information of a format necessary for video display, and outputs the information to the monitor 120.

As a result, the video synthesis device 100 can create a quasi-3D space based on two-dimensional (2D) camera images. At this time, the transforming/synthesizing unit 105 projects the image onto the projection plane virtually arranged on the 3D space, and calculates images viewed from the viewpoint virtually arranged on the 3D space. In this technique, the images are mapped to the virtual 3D space, and 2D images are generated as a video viewed from the virtual viewpoint, but the present invention is not limited thereto, and the transforming/synthesizing unit 105 may perform the mapping to the 3D space by itself, or an equivalent process to the mapping to the 3D space may be performed in mapping to a 2D space in a quasi manner.

As information that is written in or read from the memory 103, in addition to the above-described information, for example, information such as mounting information of the cameras 110-1 to 110-4 that are mounted in a vehicle in a 3D space coordinate system (for example, coordinate information and angle information), a distortion coefficient of a lens, a focal distance, or an effective pixel size of an imaging sensor may be included, or information necessary for implementing the mapping to the 3D space through the mapping to the 2D space in the quasi manner in the transforming/synthesizing unit 105 may be included. Regarding the distortion coefficient of the lens, a coefficient indicating a degree of distortion according to a distance from a center of a camera image, information indicating a relation between an incident angle of a lens and a length of a subject, and the like may be included. Particularly, in the present embodiment, as will be described later, there are cases in which a fish-eye lens is used for the cameras 110-1 to 110-4, and in the fish-eye lens, distortion in a peripheral portion is larger than that in a central portion, and thus the distortion coefficient is necessary when it is corrected. This information is used for image transformation or image synthesis in the transforming/synthesizing unit 105.

The memory 103 also stores information related to the virtual projection plane, the virtual viewpoint, and the synthesis method used by the transforming/synthesizing unit 105. As the information of the virtual viewpoint, coordinate information (Xv, Yv, Zv) and angle information ($\alpha$v, $\beta$v, $\gamma$v) with respect to each axis are stored. As the information of the virtual projection plane, for example, central coordinates and a radius of a spherical object are stored as a combination of the spherical object and a plane that is parallel to the ground surface and has the same height as the ground surface. This information may be a more complicated shape or a combination of a plurality of shapes or may be information described by (Xt, Yt, Zt) used as information of a 3D object that is commonly known. As the information related to the synthesis method, information related to $\alpha$ blending which will be described later is stored as the synthesis method of the overlapping region.

Next, an example of a process of performing coordinate conversion from pixels of a photographing camera image into pixels of an image viewed from the virtual viewpoint will be described below with reference to FIG. 3.

Figure 3:
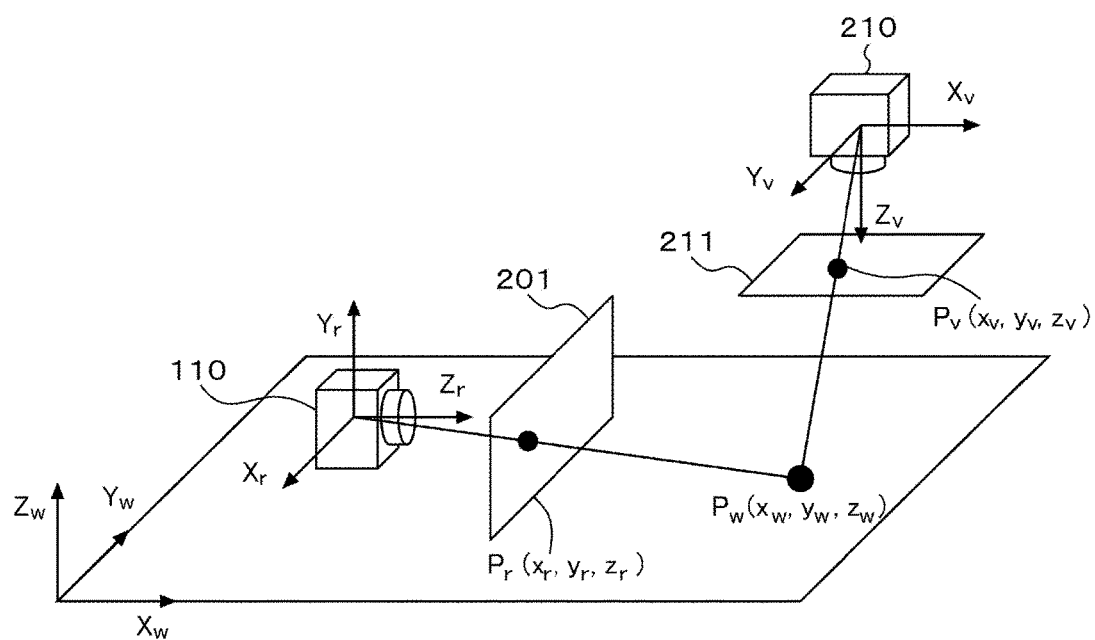
FIG. 3 is a diagram for describing a process of performing coordinate conversion from pixels of a photographing camera video into pixels viewed from a virtual viewpoint in the video display system.

In FIG. 3, a pixel of an image 201 photographed by an actual in-vehicle camera (here, representatively indicated by reference numeral 110) is indicated by a point Pr (xr, yr, zr) in a camera coordinate system (Xr, Yr, Zr) for the camera 110. Here, in the camera coordinate system, for example, a depth direction with respect to the camera 110 is indicated by Zr, a horizontal direction of a photographed image is indicated by Xr, and a vertical direction is indicated by Yr. The point Pr corresponds to a point Pw (xw, yw, zw) in a world coordinate system (Xw, Yw, Zw) that is used in common in a space. A pixel of an image 211 when the point Pw in the world coordinate system is photographed from a virtual viewpoint 210 arranged in a certain virtual position corresponds to the point Pv (xv, yv, zv) in the camera coordinate system (Xv, Yv, Zv) with respect to the virtual viewpoint 210. In other words, the following coordinate conversion is performed to generate an image viewed from a certain virtual position.

A relation between the point Pr in the camera coordinate system and the point Pw in the world coordinate system for the actual camera 110 is indicated by the following Formula (1) using a 4×4 perspective projection transformation matrix Mr.

$$\begin{bmatrix} x_r \\ y_r \\ z_r \\ 1 \end{bmatrix} = M_r \begin{bmatrix} x_w \\ y_w \\ z_w \\ 1 \end{bmatrix} \quad [\text{Math. 1}]$$

A relation between the point Pv in the camera coordinate system and the point Pw in the world coordinate system for the virtual viewpoint 210 is indicated by the following Formula (2) using a perspective projection transformation matrix Mv.

$$\begin{bmatrix} x_v \\ y_v \\ z_v \\ 1 \end{bmatrix} = M_r \begin{bmatrix} x_w \\ y_w \\ z_w \\ 1 \end{bmatrix} \quad [\text{Math. 2}]$$

Here, Mp and Mv include a 3×3 rotating matrix R and a 3×1 translation matrix T as in the following Formula (3).

$$M_r = \begin{bmatrix} R & T \\ 0 & 1 \end{bmatrix}, M_v = \begin{bmatrix} R & T \\ 0 & 1 \end{bmatrix} \quad [\text{Math. 3}]$$

Using Formulas (1) and (2), a relation of the point Pr in an actual camera coordinate system and the point Pv in the virtual viewpoint coordinates can be obtained by the following Formula (4), that is, a pixel value of a virtual viewpoint that is desired to be generated can be obtained by a calculation based on a pixel value photographed by an actual camera.

$$\begin{bmatrix} x_v \\ y_v \\ z_v \\ 1 \end{bmatrix} = M_v M_r^{-1} \begin{bmatrix} x_r \\ y_r \\ z_r \\ 1 \end{bmatrix} \quad [\text{Math. 4}]$$

A 4×4 matrix obtained by multiplying My by an inverse matrix of Mr using information such as an installation position and an installation angle of a camera on the world coordinate system, a focal distance that is an internal parameter of a camera, and an effective pixel size of a sensor. In other words, using the above Formulas, the transforming/synthesizing unit 105 converts an image of the actual camera 110 into an image viewed from the virtual viewpoint arranged at a certain position.

Subsequently, an example in which the four in-vehicle cameras 110-1 to 110-4 are used as described above will be described in an embodiment to be described below, but the present invention is not limited thereto, and the number of actual cameras 110 may be one. For example, when the fish-eye lens is used as the camera 110, a necessary angle of view may be covered by one camera depending on the purpose. Thus, the following embodiment can be applied even when the number of cameras is one.

Here, referring back to FIGS. 2A to 2C, as an example of installation of a camera in the present embodiment, a state in which the cameras 110-1 to 110-4 of the imaging unit 110 in FIG. 1 are mounted on a vehicle 300 is illustrated, and in further detail, FIG. 2A is a left side view of a vehicle, and FIG. 2B is a plane (top) view. In other words, there is the vehicle 300 on the ground surface 310, the four cameras 110-1, 110-2, 110-3, and 110-4 are installed on the front and rear portions and the left and right portions of the vehicle 300 downwards with a predetermined angle of depression, and Each camera has an angle of view to have a certain overlapping region between its photographing range and a photographing range of a neighboring camera.

FIG. 2C illustrates imaging ranges of the cameras 110-1, 110-2, 110-3, and 110-4. It is understood in FIG. 2C that the imaging ranges of the cameras 110-1, 110-2, 110-3, and 110-4 are indicated by hatched regions 311, 312, 313, and 314, and there are overlapping regions 321, 322, 323, and 324 therebetween. Hereinafter, the present embodiment will be described based on the camera installation condition illustrated in FIGS. 2A and 2B.

A problem in a converted image when the virtual projection plane and the virtual viewpoint are set without consideration of distortion of an object will be described with reference to FIGS. 4A and 4B and FIG. 5.

Figure 4A:
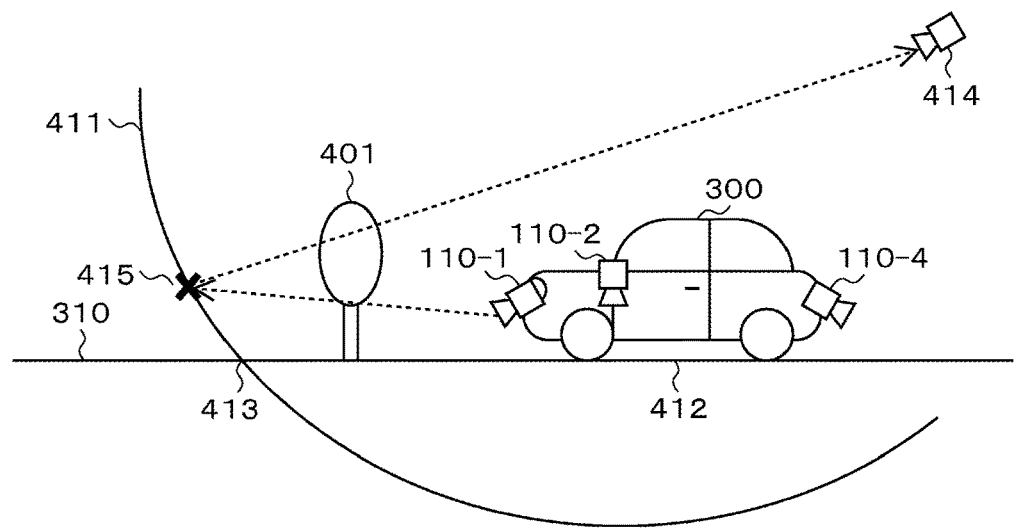
FIGS. 4A and 4B are a left side view and a plane view of a first layout for setting a virtual projection plane and a virtual viewpoint in the video display system.
Figure 4B:
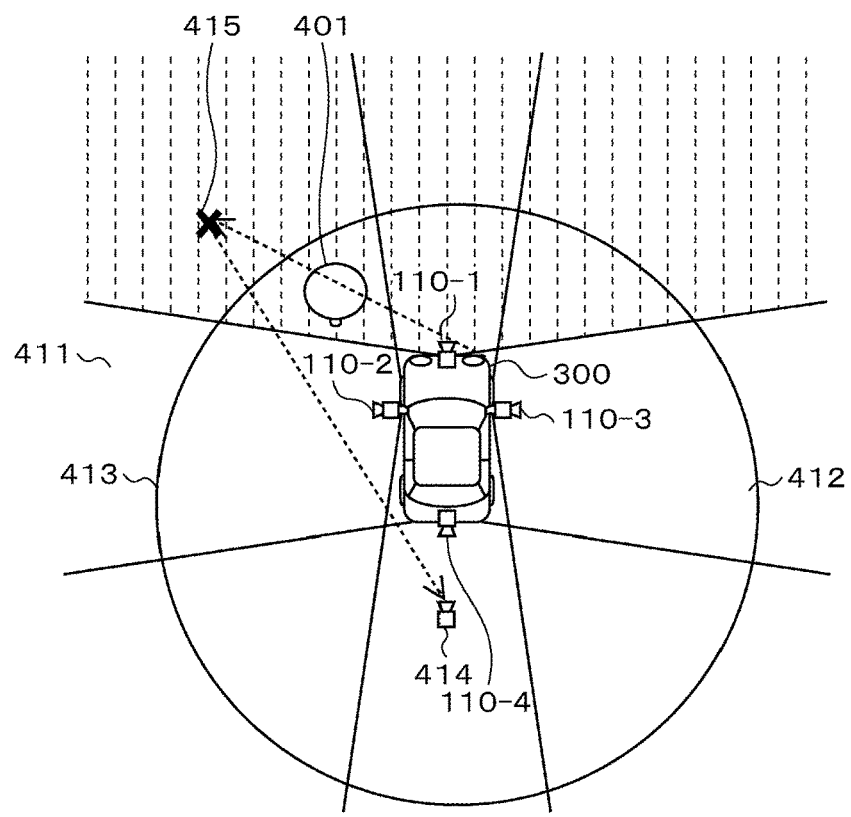

FIGS. 4A and 4B are layouts illustrating an example of the virtual projection plane and the virtual viewpoint that are set around the vehicle in the present embodiment. Unlike FIGS. 2A and 2B, there is, for example, an object of interest 401 that is a 3D object such as a standing tree on the left side ahead of the vehicle 300. A plane 412 that has the same height as the ground surface 310 and is parallel to the ground surface is defined, a virtual projection plane configured with a virtual spherical surface 411 is arranged at a position farther than the object of interest 401, and the plane 412 and the spherical surface 411 intersect along a circle 413. In other words, a virtual viewpoint is set at an installation position and an installation angle at which a vehicle body and an area in front of the vehicle are viewed downwards behind the vehicle 300 as illustrated in FIG. 4A. The spherical surface 411 need not be exactly a spherical body and may be a rotating body of an arbitrary curved line that is designed so that a video projected onto the virtual projection plane is naturally viewed or any other curved surface.

Figure 5:
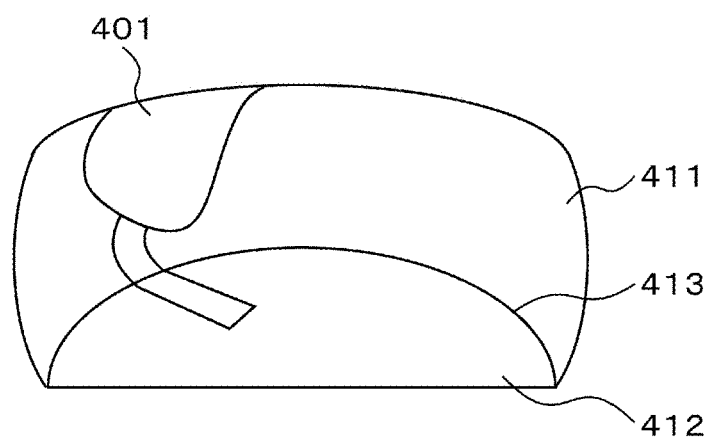
FIG. 5 is a diagram illustrating a video viewed from a virtual viewpoint when a setting of FIGS. 4A and 4B is performed in a photographing camera.

FIG. 5 illustrates a converted image when a state in which a video of the camera 110-1 is projected onto the virtual projection planes 411 and 412 set in FIGS. 4A and 4B (hereinafter, referred to as a "virtual projection state") is viewed from a virtual viewpoint 414 set in FIGS. 4A and 4B.

An example of converting the object of interest 401 shown on the left side ahead of the vehicle 300 into an image photographed by the camera 110-1 will be described below, but the position of the object of interest 401 may be any position around the vehicle 300, and a photographing camera is not limited to the camera 110-1 and may be any one of the other cameras 110-2, 110-3, and 110-4.

The video photographed by the camera 110-1 is projected onto the spherical surface 411 serving as the virtual projection plane and the plane 412 as illustrated in FIGS. 4A and 4B. In other words, the object of interest 401 is projected onto a crossing point 415 of an extension of a straight line connecting the camera 110-1 with the object of interest 401 and the virtual projection plane.

FIG. 5 illustrates an image viewed from the virtual viewpoint, and the image includes the object of interest 401, a region projected onto the virtual projection plane 411 serving as the spherical surface, a region projected onto the virtual projection plane 412 serving as the plane, and a boundary 413 between the spherical surface and the plane. In the image viewed from the virtual viewpoint, the ground surface 310 is at the same level as the planar virtual projection plane 412 because it is at the same position as the planar projection plane, and a non-distorted image with a sense of perspective can be formed on the region 412, but the object of interest 401 that is the 3D object such as the standing tree is projected as a surface in a part of the planar projection plane 412 and thus is viewed as a distorted image with no a sense of perspective.

This the same for the region that is the virtual projection plane 411 of the spherical surface, and since the object of interest 401 is projected onto the spherical projection plane 411 that differs in a position (that is, is deviated), an image viewed from the virtual viewpoint 413 is viewed as a distorted image that collapses obliquely.

The present invention was made to solve the above-described distortion, and in the present embodiment, generation of a converted image that is less distorted will be described with reference to FIGS. 6A and B and FIG. 7.

Figure 6A:
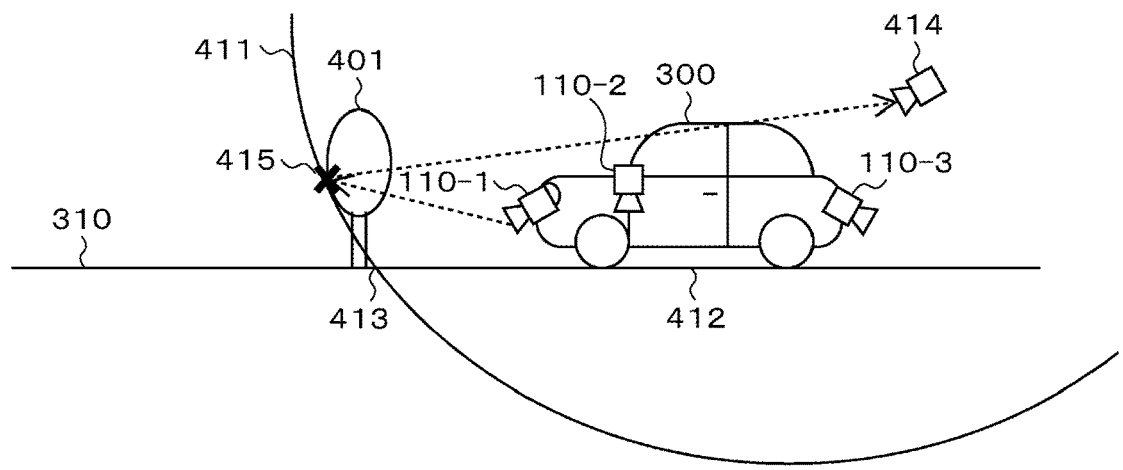
FIGS. 6A and 6B are a left side view and a plane view of a second layout for setting a virtual projection plane and a virtual viewpoint in the video display system.
Figure 6B:
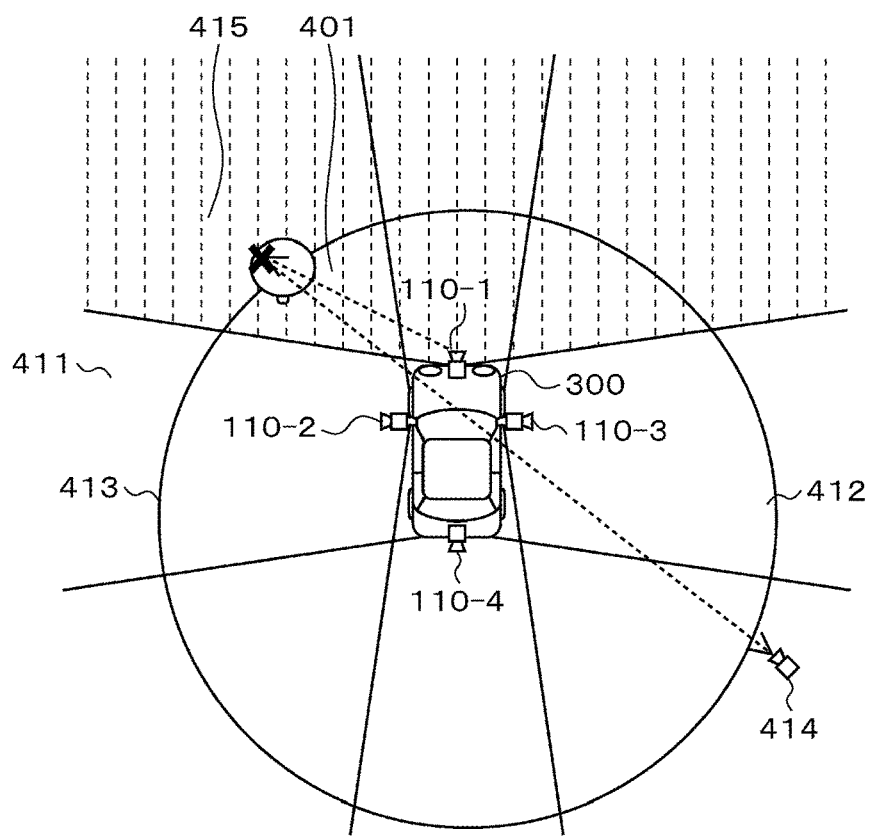

FIGS. 6A and 6B are layouts illustrating an example of a virtual projection plane and a virtual viewpoint set around a vehicle 300 in the present embodiment, and similarly to FIGS. 3A and 3B, there is an object of interest 401 that is a 3D object (a standing tree) on the left side ahead of the vehicle 300. In this setting, a virtual spherical projection plane 411 is arranged at a position closer to the object of interest 401 than that in FIGS. 4A and 4B. A virtual viewpoint 414 is set at a position lower than that in FIGS. 4A and 4B at an installation position and an installation angle at which the vehicle body of the vehicle 300 and an area in front of the vehicle 300 are viewed downwards from the right rear side.

FIG. 7 illustrates a converted image viewed from the virtual viewpoint 414 set in FIGS. 6A and 6B when the video of the camera 110-1 is projected onto the virtual projection planes 411 and 412 set in FIGS. 6A and 6B. In this case, as is clear from FIG. 7, in the image of the object of interest 401, an area projected onto the planar projection plane 412 is small, a difference in a position (a position deviation) between the spherical projection plane 411 and the object of interest 401 is small, and thus distortion on the video is small.

The virtual viewpoint 414 is set so that an angle difference between a line connecting the actual camera 110-1 with a crossing point 415, that is, a point 415 at which an extension of a line connecting the actual camera 110-1 with the object of interest 401 crosses the virtual projection plane 411 and a lie connecting the crossing point 415 with the virtual viewpoint 414 is a predetermined value or less.

As a result, as is clear from FIG. 7, it is understood that compared to the converted image illustrated in FIG. 5, distortion in which a sense of perspective of the image 401 of the object of interest is lost is reduced, and distortion in which an object collapses obliquely is less displayed.

As illustrated in FIG. 4A to FIG. 7, a sense of distance around the vehicle 300 and a way in which the object of interest 401 looks greatly change according to a setting of the virtual projection plane 411 and the virtual viewpoint 414. In other words, in order to cause the image of the object of interest 401 such as the standing tree to be viewed to be less distorted, it is necessary to make the 3D surface of the virtual projection plane 411 close to the object of interest 401, and it is necessary to perform a setting so that an angle difference between the line connecting the virtual viewpoint 414 with the object of interest 401 and the straight line connecting the actual camera 110-1 with the object of interest 401 is reduced.

Next, an example of a method of deciding the virtual viewpoint 414 in FIG. 6B from the point of view described above will be described with reference to FIG. 8.

Figure 8:
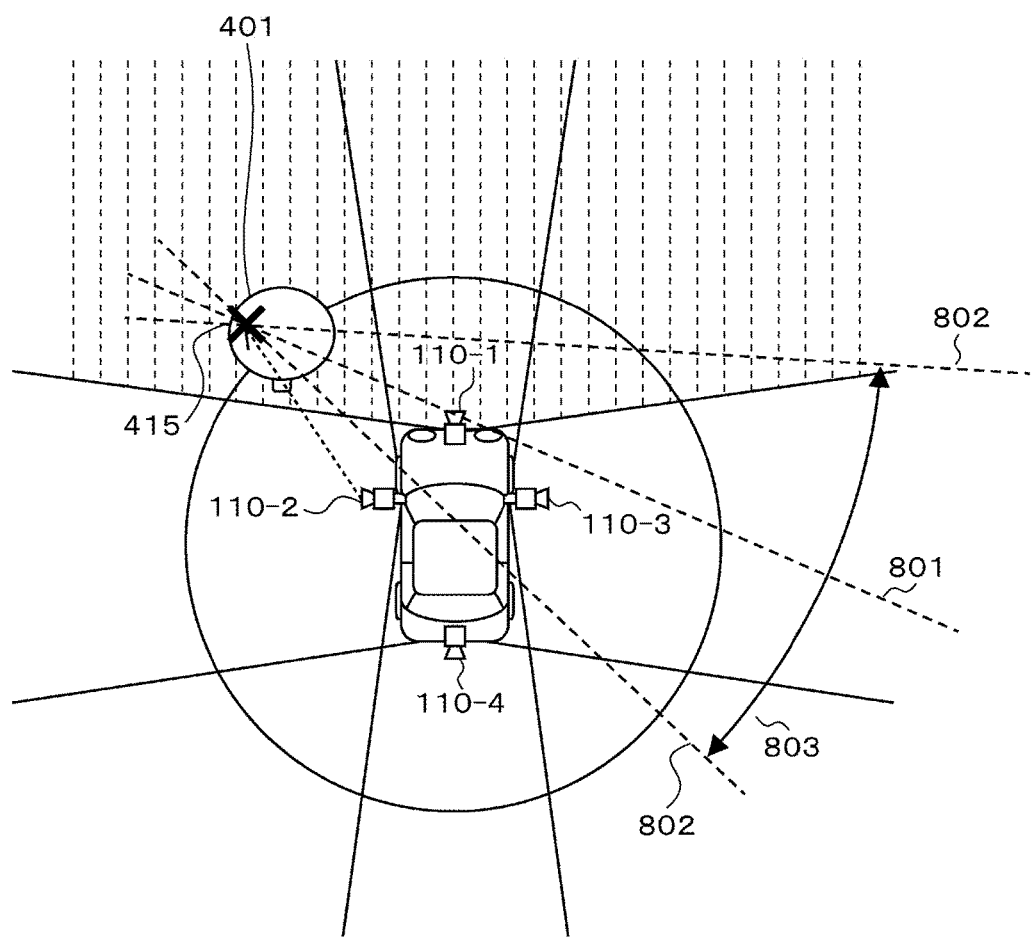
FIG. 8 is a diagram illustrating a settable range of a virtual viewpoint in a condition of FIG. 6B.

As illustrated in FIG. 8, first, a vector 801 from a point on the object of interest 401 to the actual camera 110-1 is obtained, and the virtual viewpoint 414 is set within a predetermined angle range 802 (an arrow 803) with respect to the vector 801. Accordingly, an angle between the straight line connecting the actual camera 110-1 with the object of interest 401 and the line connecting the virtual viewpoint 414 with the object of interest 401 is smaller than a predetermined angle, and thus distortion of a synthesized video can be reduced. For example, when an angle (a minor angle) between the line connecting the virtual viewpoint 414 with the object of interest 401 in FIG. 6B and the vector 801 in FIG. 8 is indicated by $\Delta\theta$, and a distance between the object of interest 401 and the point 415 is indicated by D, a distance from a crossing point of the virtual projection plane 411 and the line connecting the virtual viewpoint 414 with the object of interest 401 to the point 415, that is, a deviation amount of the object of interest 401 when the synthesized video is generated by the virtual viewpoint 414 is considered. For the sake of simplicity, when it is assumed that the deviation amount can approximate to $D \times \Delta\theta$, and an allowable deviation amount of the synthesized video is indicated by E, a range of $\Delta\theta$ is $\Delta\theta < E/D$, and when the virtual viewpoint 414 is set within the range of $\Delta\theta$, the distortion of the synthesized video can be suppressed to be within the allowable range.

By setting the virtual viewpoint 414 at a position of $\Delta\theta$ at which distortion is smaller than one pixel in an image generated by the transforming/synthesizing unit 105 according to the distance D between the object of interest 401 and the point 415, it is possible to synthesize an image in which the object of interest 401 is displayed with distortion equal to that of the synthesized video viewed from the virtual viewpoint on the vector 801.

A value of the allowable deviation amount E may be set at the time of shipment from a factor or may be set by the user. When the value of the allowable deviation amount E is stored in the memory 103 or a storage unit (not illustrated) included in the video synthesis device 100, it is possible to the virtual viewpoint 414 at an appropriate position even when the distance D between the actual camera 110-1 and the object of interest 401 is changed.

Figure 9:
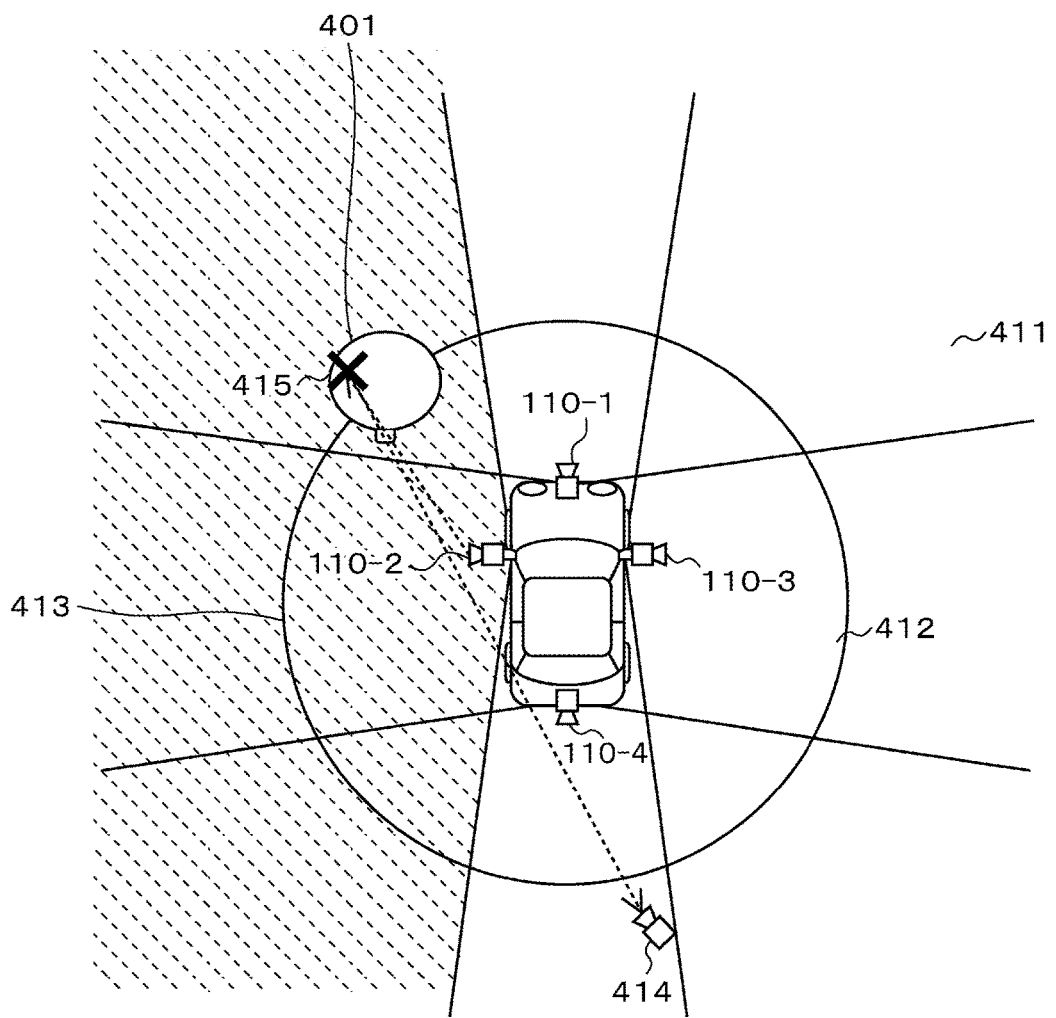
FIG. 9 is a diagram illustrating another setting of a virtual viewpoint in an object of interest in FIG. 6B.

Further, when the object of interest 401 is within a region in which the angles of view of a plurality of cameras overlap as in the object of interest 401 illustrated in FIG. 6B, the virtual projection plane 411 and the virtual viewpoint 414 can be decided so that image conversion from a video of another camera 110-2 is performed, for example, as illustrated in FIG. 9 and FIG. 10. In this case, similarly to FIGS. 6A and 6B, it is desirable that the virtual projection plane 411 be set so that a minimum distance from the surface of the object of interest 401 is a predetermined value or less, and the position and the angel of the virtual viewpoint 414 be set so that an angle difference with the line connecting the left camera 110-2 with the object of interest 401 is reduced in the example of FIG. 9, and when the object of interest 401 is in the overlapping region, the position of the virtual viewpoint 414 is obtained based on the line connecting with the camera 110-1 with the object of interest 401 or the line connecting the camera 110-2 with the object of interest 401 according to one of the camera 110-1 and the camera 110-2 that is higher in a resolution with which the object of interest 401 is imaged and the number of pixels when the object of interest is formed as an image. One which is smaller in a distance between the camera and the object of interest may be selected, or one which is close in the traveling direction of the vehicle may be selected.

FIG. 7 and FIG. 10 illustrate the examples of the images obtained converted based on the images photographed by the front camera 110-1 and the left camera 110-2, but when the transforming/synthesizing unit 105 (see FIG. 1) in the device synthesizes the images of the respective cameras through the a blending, an image to be employed may be determined, for example, under a condition to be described.

For example, in a state in which the vehicle takes a left turn at the intersection at a relatively low speed, a request for widely displaying a video of a left area having a collision possibility in the traveling direction is inferred, and in this case, the virtual viewpoint 414 is set as illustrated in FIG. 6B, and the leftward direction is widely displayed. Alternatively, when the vehicle is traveling forward at a relatively high speed, and a request for widely displaying a video of a front area having a high collision possibility is inferred, the virtual viewpoint 414 is set as illustrated in FIG. 9, and the forward direction is widely displayed.

Figure 11A:
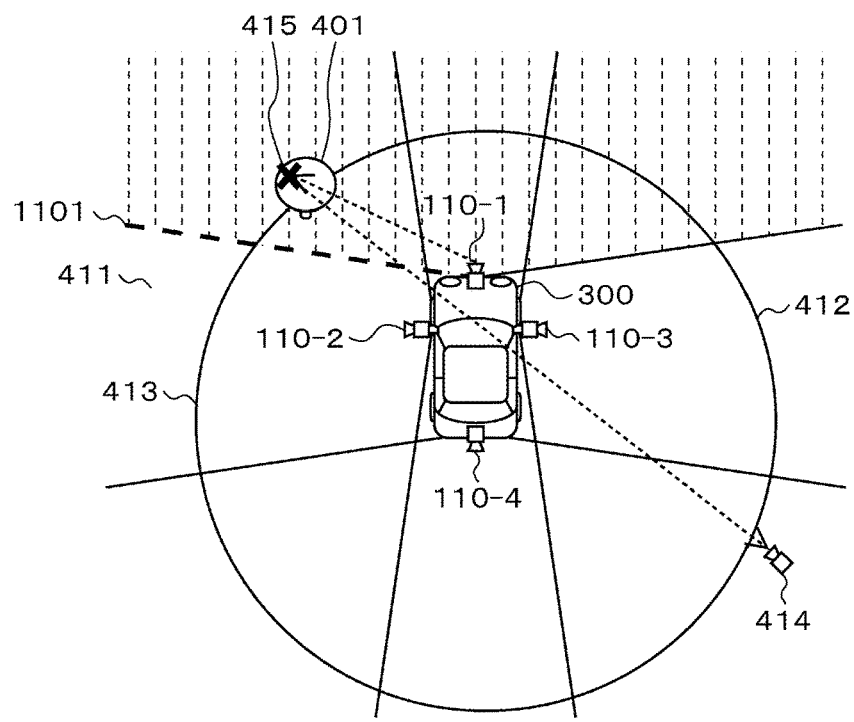
FIGS. 11A and 11B are diagrams for describing a setting of a method of synthesizing a video at the time of setting of FIG. 6B and FIG. 9.
Figure 11B:
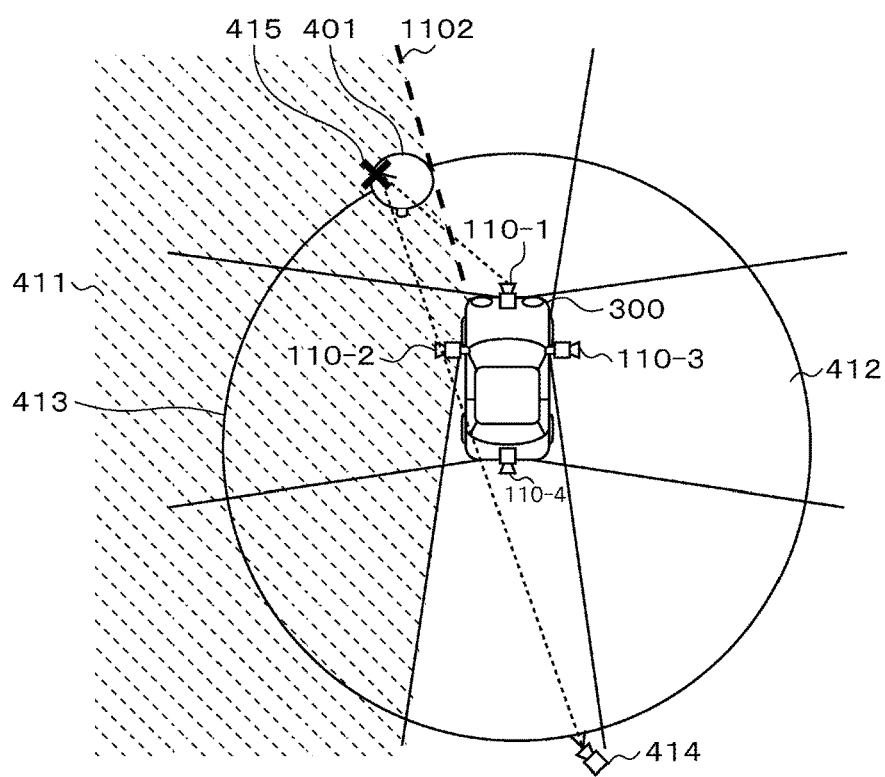

Next, FIGS. 11A and 11B illustrate joint setting examples under the conditions illustrated in FIG. 6B and FIG. 9. In both cases, a setting in which a portion in which the object of interest 401 is shown deviates from a joint of camera videos is assumed to be performed in a blending synthesis of the overlapping region 321 illustrated in FIG. 2C. In the examples of FIGS. 11A and 11B, straight lines denoted by thick broken lines 1101 and 1102 indicate joints at the time of synthesis, and each video is delimited using the lines as a boundary. In FIG. 11A, as described above with reference to FIG. 8, in order to reduce the distortion of the object of interest 401 in the synthesized video, the virtual viewpoint 414 is installed to have a predetermined angle with respect to the line connecting the front camera 110-1 with the object of interest 401. At this time, since the image photographed by the front camera 110-1 is used as the synthesized image of the object of interest 401, the broken line 1101 of the delimiter is set on the left camera 110-2 side further than the object of interest 401. Similarly, in FIG. 11B, the virtual viewpoint 414 is installed to reduce the distortion of the synthesized image at the position of the object of interest 401, and the image photographed by the left camera 110-2 is used as the synthesized image, and the broken line 1102 of the delimiter is set on the front camera 110-1 side further than the object of interest. In other words, a blending position of the overlapping region 321 is decided based on a relation among the position of the object of interest 401, the position of the camera that images the object of interest 401, and the position of the virtual viewpoint 414, and when the position of the virtual viewpoint 414 is arranged to be within a predetermined angle with respect to the straight line connecting the front camera 110-1 with the object of interest 401, the blending position is set on the left camera 110-2 side so that the video of the object of interest 401 imaged by the front camera 110-1 is used, and when the position of the virtual viewpoint 414 is arranged to be within a predetermined angle with respect to the straight line connecting the left camera 110-2 with the object of interest 401, the blending position is set on the left camera 110-1 side so that the video of the object of interest 401 imaged by the front camera 110-2 is used. The broken lines 1101 and 1102 set herein may be statically set according to an angle of view of the camera 110-1 or the camera 110-2 regardless of the position of the object of interest 401 and may be set at a position that does not correspond to a full view of the object of interest as long as the shape or the size of the object of interest 401 is known. The present invention is not limited thereto, and a value of a may be changed within a certain range stepwise using this line as a boundary, or the lines may be an arbitrary curved line rather than a straight line such as the thick broken lines 1101 and 1102. For example, when the object of interest 401 is larger than the overlapping region 321, and the joint is included on the object of interest 401 regardless of a setting position of the joint at the time of blending synthesis, it may be detected, the joint at the time of blending synthesis may be set on the object of interest 401 as necessary, and synthesis may be performed to change a value of a within a certain range using the joint as a boundary. Further, when it is possible to detect the traveling direction of the vehicle via the CAN or the like, if the vehicle is traveling forwards, for example, in the case of FIG. 11A, the blending position may be set on the front camera 110-1 side, or when the vehicle takes a left turn in the case of FIG. 11B, the blending position may be set on the left camera 110-2 side. It is because, for example, when the vehicle is traveling forwards in FIG. 11A, the object of interest 401 moves toward the left side behind the vehicle if relatively viewed, and when the blending position is set to 1101, it is necessary to switch the camera that images the object of interest 401 from the front camera 110-1 to the left camera 110-2. Thus, when the object of interest 401 imaged by the left camera 110-2 is initially used for synthesis, it is unnecessary to switch the camera, and it is possible to reduce a possibility that the object of interest 401 will disappear from the synthesized image.

In the present embodiment, in order to reduce the computational complexity, the example in which the virtual projection plane is indicated by the simple plane and the spherical surface has been described, but the present invention is not limited thereto, and for example, a statistical clustering process based on a feature quantity may be performed according to the accuracy of information detected by the detecting unit 104 illustrated in FIG. 1, and objects including a building, a wall, a guardrail, the sky, and the like may be arranged on the space together with the ground surface (road) 310 in view of the spatial position relation and the 3D shape thereof and synthesized with the video. As a result, it is possible to form more accurate 3D projection of surrounding areas, that is, it is possible to generate a natural video of a 3D shape having less distortion.

Next, FIG. 12 is a flowchart illustrating an example of a process performed in the video display system according to the present embodiment, particularly, a process performed by the CPU 102 of the video synthesis device 100, that is, an example of an operation of deciding a method of synthesizing the shape of the virtual projection plane, the installation position and the installation angle of the virtual viewpoint, and the overlapping region according to the object of interest, and a description thereof will be described below in detail according to step numbers in which S is added to a beginning part thereof.

First, when a process flow starts in step S1200, in S1201 (an image recognizing unit), the detecting unit 104 detects or determines the position of the object of interest, and acquires a relative position to its own vehicle or an appropriate reference point. As information acquired herein, a position of the object of interest on a plane view (for example, the standing tree 401 in the above example), that is, a position of the ground surface 310 is necessary, and as described above, information as to whether or not the object of interest is a 3D object and a detailed 3D shape thereof may be acquired together.

Then, in S1202, a camera that photographs the object is specified based on the acquired position of the object of interest. The camera is specified based on the position of the object of interest, the installation position, the installation angle, and the angle of view of the camera, or the like. When a plurality of cameras that photograph the object are specified under this condition, the object of interest is determined to be in the overlapping region since there are a plurality of cameras that photograph the object of interest. However, instead of using this condition, a simple method may be used, for example, the camera that photographs the object of interest may be specified based on a result of image recognition, or a photographing camera may be uniquely specified based on the relative position of the object of interest to the vehicle. It is used as the determination condition in the determination step S1207 which will be described later whether or not a plurality of cameras photograph the object of interest duplicatedly.

Then, in S1203, a vector of the object of interest and the photographing camera is obtained. This vector may be a 2D vector in which a height on a plane view is not considered or may be a 3D vector including a height as well. Further, when this vector is obtained, a point on the object of interest may be designated, or a set of a plurality of vectors may be obtained by designating a plurality of points on the object of interest.

Further, in S1204, a virtual viewpoint position is decided based on the vector obtained in S1203 within a range having an angle difference within a certain value with the vector as illustrated in FIG. 8. At this time, the angle range may have individual values in three axes on the world coordinates. Thereafter, in S1205, the shape of the virtual projection plane is decided based on a distance between the object of interest and the position of its own vehicle or a distance between the object of interest and the reference point. For example, in the case of the virtual projection planes of the plane and the spherical surface illustrated in FIG. 4A to FIG. 11B, the center coordinates and the radius of the spherical body are set so that the position difference (the position deviation) between the object of interest and the projection plane is reduced. As described above, the projection plane may have a complicated shape according to the 3D shape of the object of interest.

Then, in S1206, it is determined whether or not the number of photographing cameras specified in S1202 is one or two or more, and a subsequent process is switched based on a result thereof.

First, when the "position is determined to be in the overlapping region of the camera videos" in S1206, in S1207, in addition to the conditions of the position of the object of interest and the virtual viewpoint and the virtual projection plane decided in S1204 and S1205, a camera whose video is used is selected among a plurality of cameras that photograph the object of interest, and the synthesis method of the overlapping region is decided.

On the other hand, when the "position is determined not to be in the overlapping region of the camera videos" in S1206, in S1208, the synthesis method of the overlapping region is decided according to the conditions of the position of the object of interest and the virtual viewpoint and the virtual projection plane decided in S1204 and S1205.

Thereafter, subsequently to S1207 or S1208, in S1209, the images of the respective cameras are transformed and synthesized based on the virtual projection plane, the virtual viewpoint, and the synthesis method of the overlapping region decided until S1208, and a resulting video is output to the monitor 120 via the encoding unit 106 of FIG. 1.

An example of the synthesis method of the overlapping region according to the present embodiment will be more specifically described with reference to FIG. 13, FIG. 14, and FIG. 15.

Figure 13:
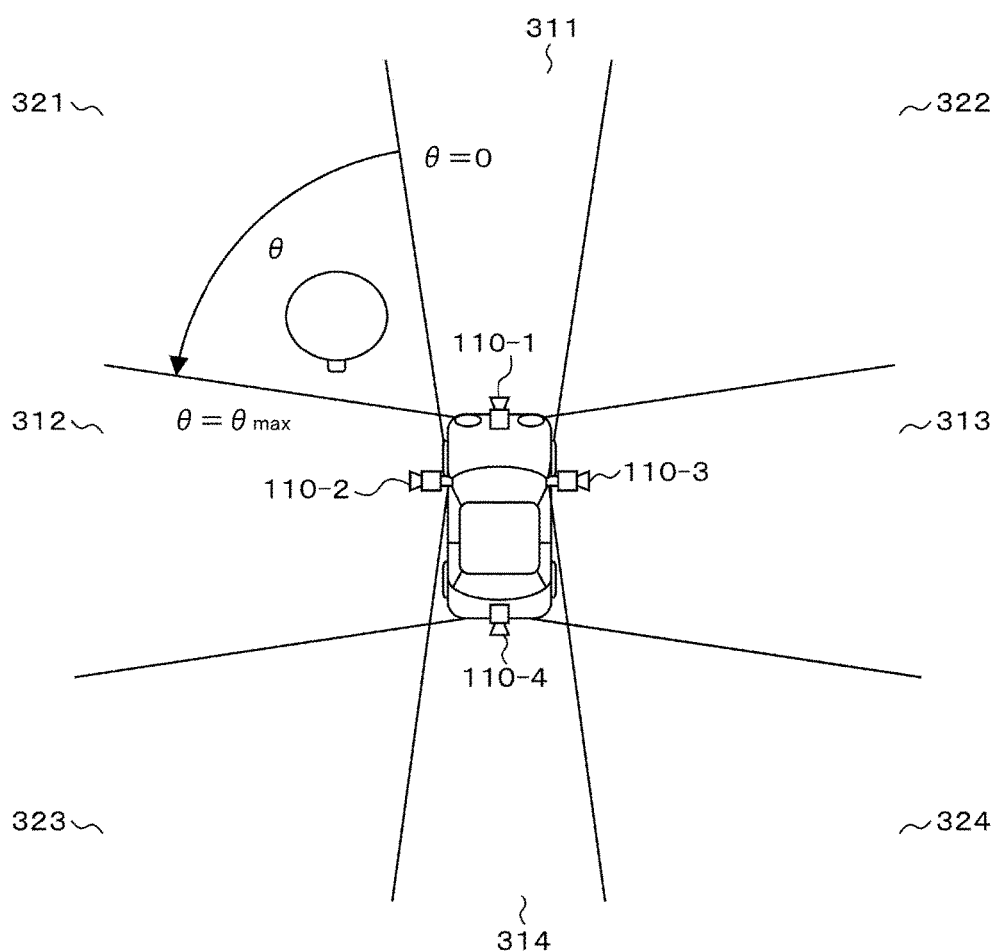
FIG. 13 is a diagram illustrating an example in which an overlapping region of a camera video is indicated by angle information.
Figure 14:
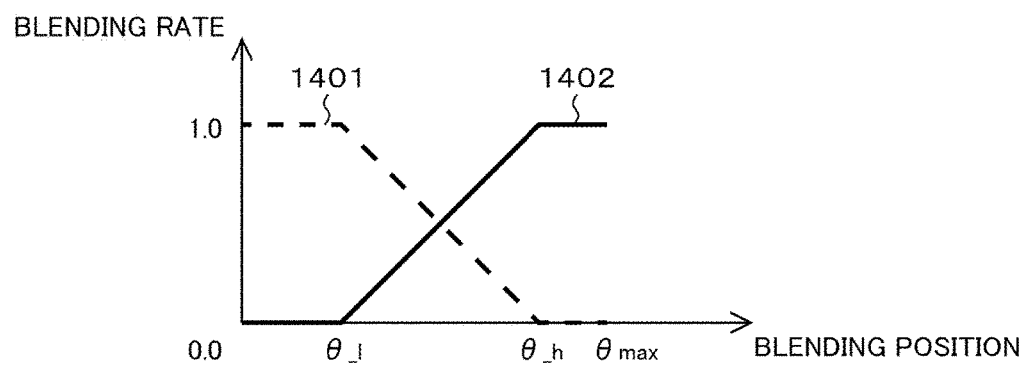
FIG. 14 is a diagram illustrating an example of a change in blending rates of two camera videos at an angle illustrated in FIG. 13.
Figure 15:
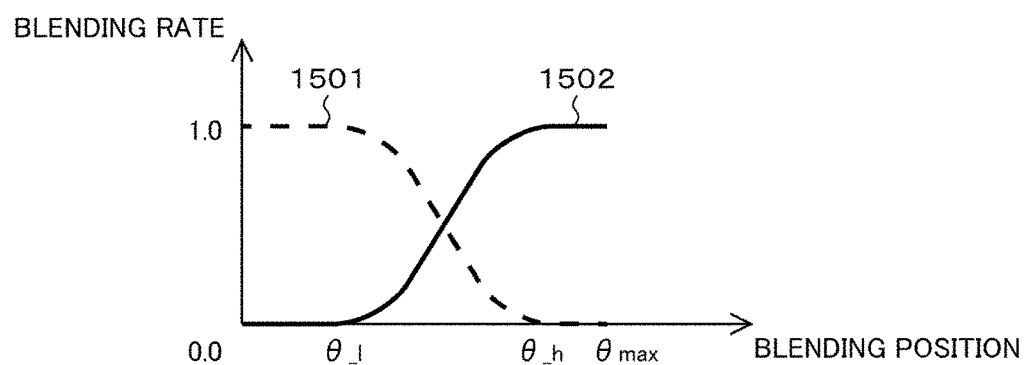
FIG. 15 is a diagram illustrating another example of a change in blending rates of two camera videos at an angle illustrated in FIG. 13.

First, referring to FIG. 13, the overlapping region 321 surrounded by two thick solid lines is used as an example, the overlapping region is described using an angle $\theta$, and a blending rate within a range of $\theta=\theta max$ from $\theta=0$ is set, for example, as illustrated in FIG. 14 or FIG. 15.

In these settings, a characteristic of the blending rate illustrated in FIG. 14 is simple, and thus an operation load is relatively small, but when $\theta$ is $\theta\_l$ or $\theta\_h$, the blending rate abruptly changes, and thus an uncomfortable feeling may be added at the time of synthesis of a joint of a video.

On the other hand, compared to that of FIG. 14, a characteristic of the blending rate illustrated in FIG. 15 is complicated but consecutive with respect to a change in $\theta$, and thus a synthesized video having a less uncomfortable feeling can be expected to be generated. In the present invention, the characteristic of the blending rate is not limited to the examples illustrated in FIG. 14 and FIG. 15. Reference numerals 1401 and 1501 in the drawings indicate the blending rates of the image photographed by the camera 110-1, and reference numerals 1402 and 1502 indicate the blending rates of the image photographed by the camera 110-2. Further, in FIG. 14, blending is steadily changed within a range of $\theta$ of $\theta\_l$ $\theta\_h$, and pixel values of the videos are weighted and averaged within this range.

As another transformation example, a synthesized video that enables a detected object of interest to be displayed as a natural image is generated, but for example, in the system diagram of FIG. 1, a video in a normal state may be displayed on the monitor 120 in addition to an image showing the object of interest. For example, the virtual projection plane and the virtual viewpoint in FIG. 4B are set as a condition of a steady state, the virtual projection plane and the virtual viewpoint in FIG. 6B are set as a condition for display the object of interest 401, and the transforming/synthesizing unit 105 generates a video in the steady state and a video for the object of interest, synthesizes the videos so that the videos are divided at a center of a display screen and arranged, and outputs a resulting video to the monitor 120 via the encoding unit 106. Accordingly, the driver can check an area around the vehicle in a wide range and understand the object of interest such as a pedestrian or an obstacle through a video having less distortion.

As another transformation example, when a plurality of objects are detected around the vehicle, the change of the virtual viewpoint may be changed so that the detected object (referred to as an "object A") other than the object of interest 401 is less distorted. It is because the distortion of the object of interest 401 is decided according to an angle formed by the virtual viewpoint 414, the object of interest 401, and the camera 110, and the distance between the virtual viewpoint 414 and the object of interest 401 can be arbitrarily set. Specifically, if a straight line connecting the virtual viewpoint 414 with the object of interest 401 is indicated by a straight line A, and a straight line connecting the object A with a camera that images the object A is indicated by a straight line B, when the virtual viewpoint 414 is set on the straight line A nearby a point at which the straight line A is closest to the straight line B, it is possible to synthesize a video in which the object of interest 401 is less distorted, and the object A is relatively less distorted either.

Further, when three or more objects are detected around the vehicle, priorities of all the objects may be decided through a similar technique to the technique of selecting one of a plurality of objects as the object of interest 401, and the position of the virtual viewpoint 414 may be decided by the above-described method so that the object of interest 401 having the highest priority and the object A having the next highest priority are less distorted.

Further, when three or more objects are detected around the vehicle, a straight line connecting an object other than the object of interest 401 with a camera that images the object may be virtualized for each object, and the virtual viewpoint 414 may be set on the straight line A nearby a position at which a distance between the straight lines is smallest.

As the position of the virtual viewpoint 414 is set as described above, it is possible to synthesize a video in which an object other than the object of interest 401 is less distorted either, and thus usability is improved.

Figure 16:
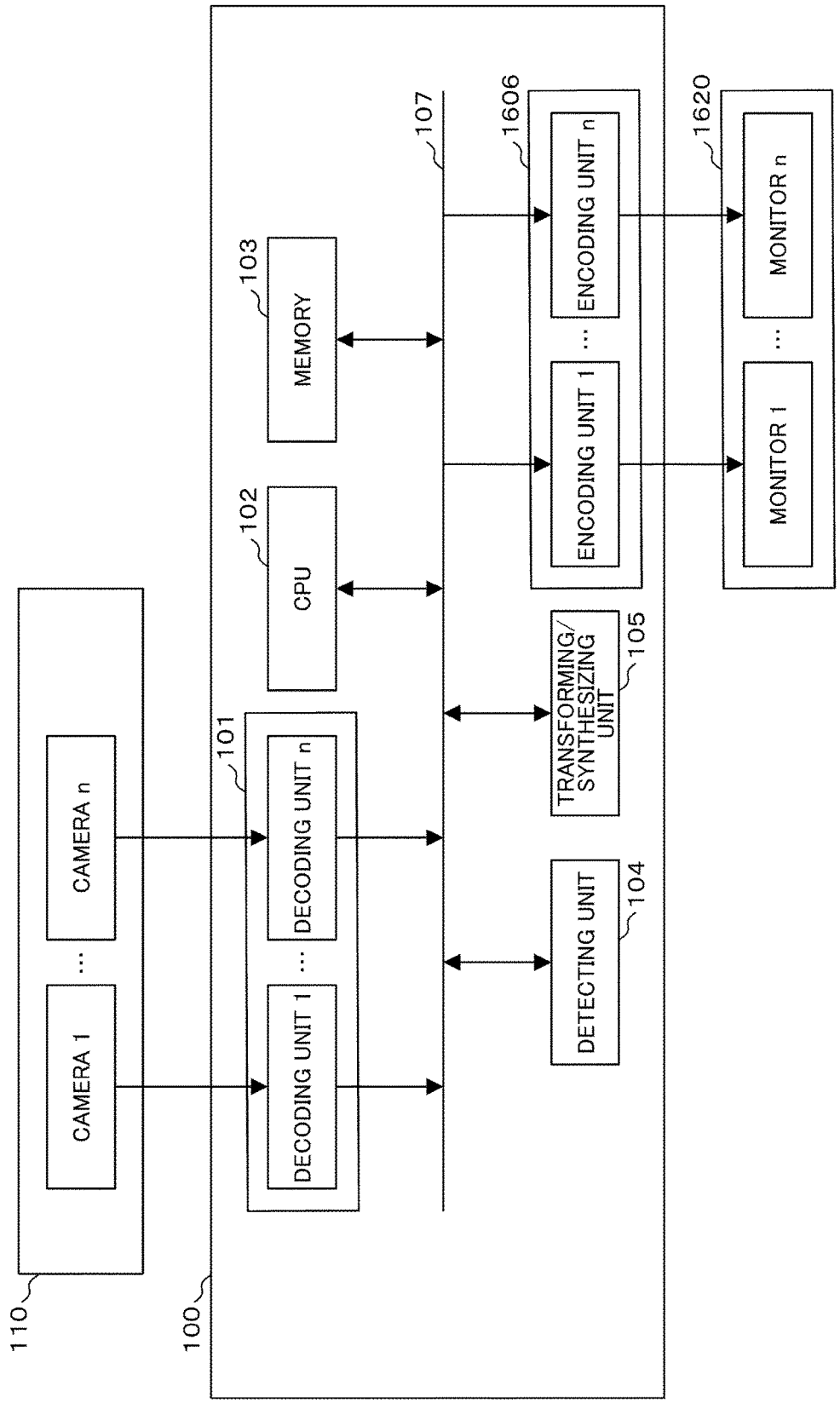
FIG. 16 is a block diagram illustrating configurations of a video synthesis device and a video display system (including a plurality of monitors) according to another embodiment of the present invention.

The exemplary embodiment of the present invention has been described above in detail, but the present invention is not limited to the above embodiment, and as another embodiment, a plurality of encoding unit 1606 and a plurality of monitors 1620 may be provided, and a video may be selectively displayed on each monitor, for example, as illustrated in FIG. 16. In this case, the object of interest to be displayed is switched according to an installation position or a display characteristic of the monitor, and the transforming/synthesizing unit 105 sets at least one of the virtual projection plane, the virtual viewpoint, and the synthesis methods of the overlapping region according to each monitor, performs transformation and synthesis, and outputs a video to the monitors 1620. Accordingly, for example, it is possible to display an appropriate video more naturally according to a feature of a monitor, for example, it is possible to cause a video in a steady state to be displayed on a navigation screen and cause a video around a vehicle that is not viewed from a driver to be displayed on a head up display (HUD).

Figure 17:
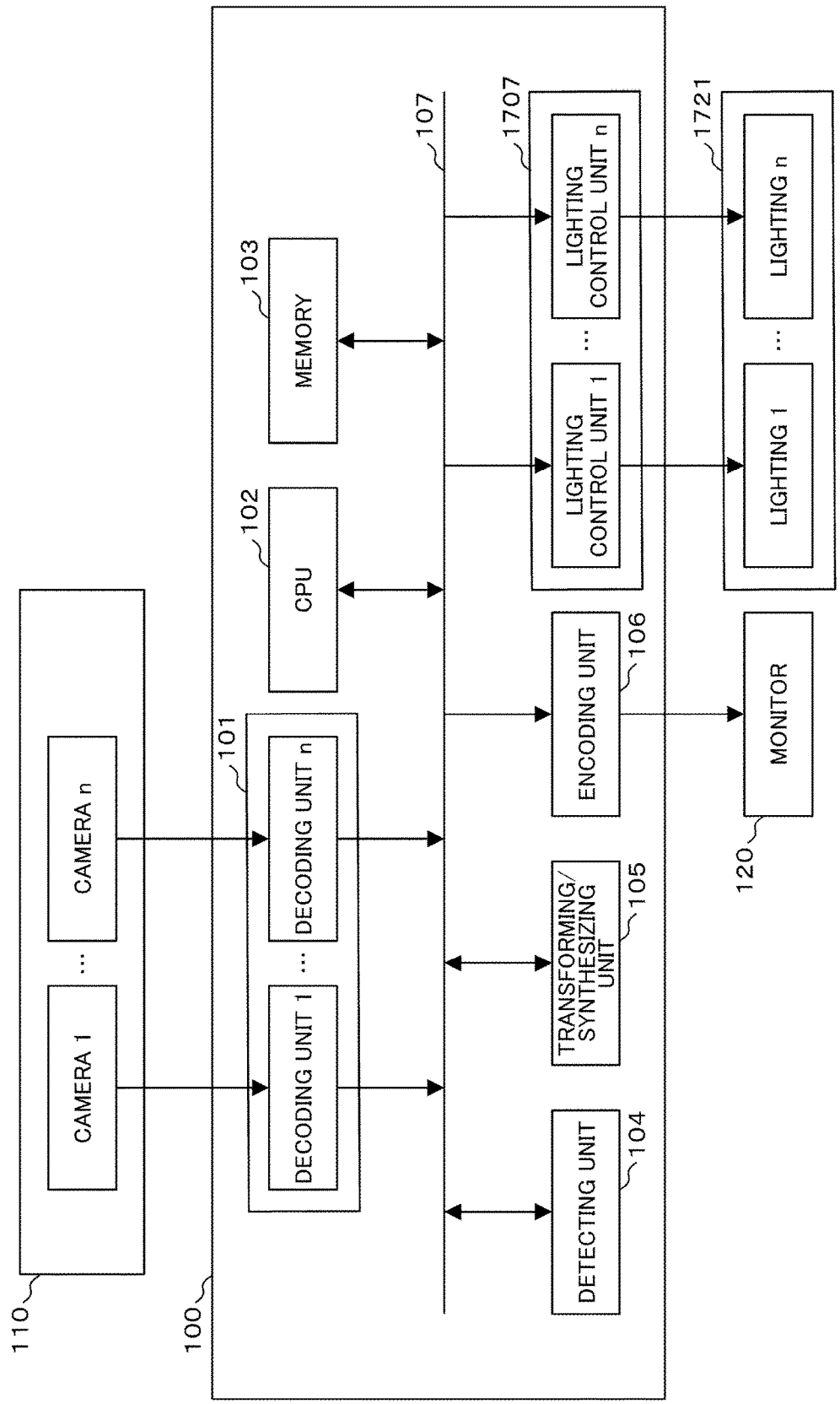
FIG. 17 is a block diagram illustrating configurations of a video synthesis device and a video display system (including a plurality of lightings) according to another embodiment of the present invention.

As another embodiment, as illustrated in FIG. 17, a plurality of lightings 1721 and a plurality of blinking control units 1707 that control blinking of a plurality of lightings are provided, and it is possible to notify of the position of the object of interest through both a video and blinking of a lighting. As an example, lightings capable of blinking independently are installed at front, rear, left, and right portions in a vehicle, and for example, when there is a dangerous object on the left side behind the vehicle, an area on the left side behind the vehicle is noticeably displayed on the monitor 120, and the lighting near the left rear portion blinks at the same time. Accordingly, the driver can be informed of the dangerous object more intuitively.

Figure 18:
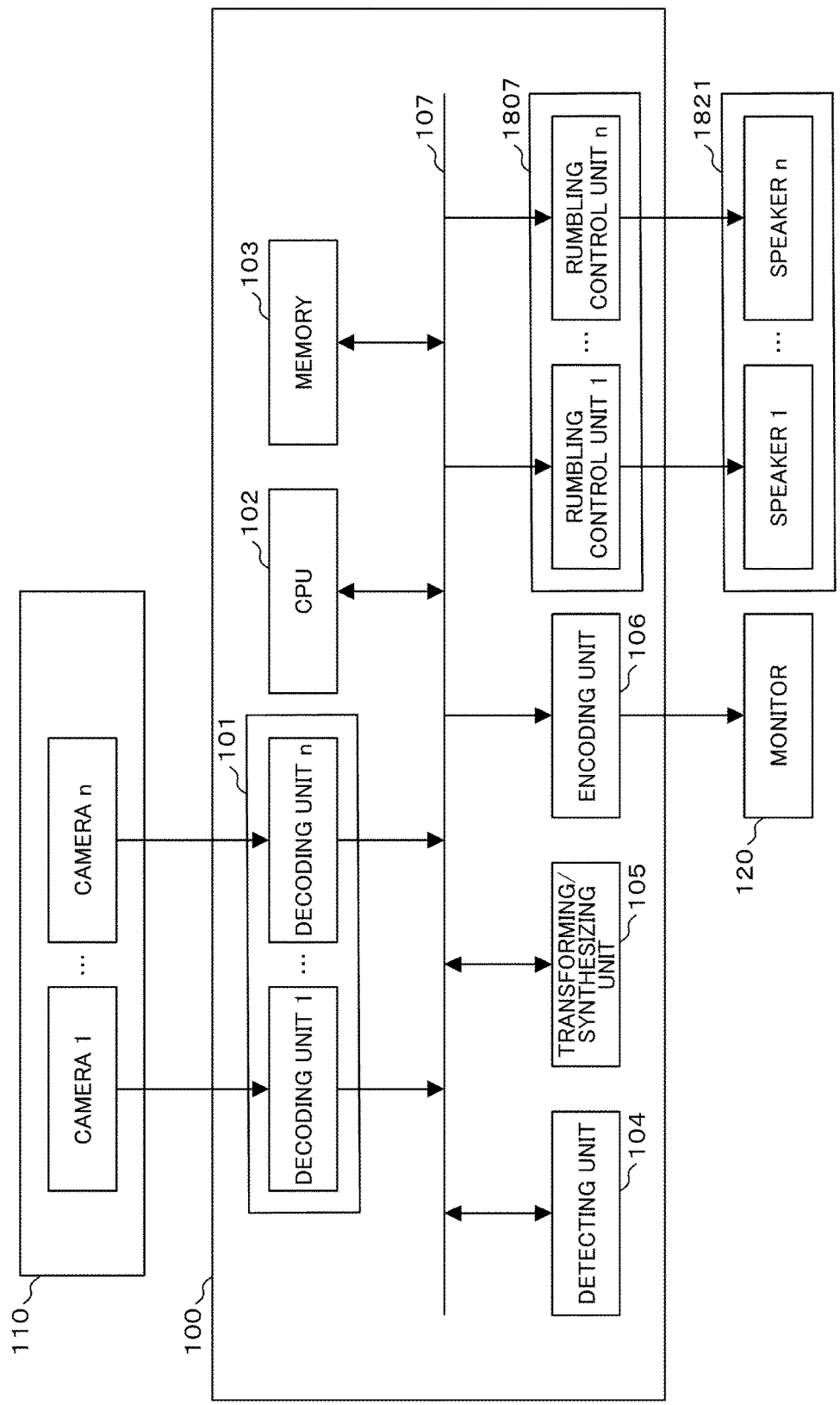
FIG. 18 is a block diagram illustrating configurations of a video synthesis device and a video display system (including a plurality of speakers) according to another embodiment of the present invention.

As another embodiment, as illustrated in FIG. 18, a plurality of speakers 1821 and a plurality of rumbling control units 1807 that control rumbling of a plurality of speakers may be provide, and it is possible to notify of the position of the object of interest through both a video and a sound. As an example, speakers capable of rumbling independently are installed at front, rear, left, and right portions in a vehicle, and for example, when there is a dangerous object on the left side behind the vehicle, an area on the left side behind the vehicle is noticeably displayed on the monitor 120, and a warning sound is output from the speaker near the left rear portion blinks at the same time. Accordingly, the driver can be informed of the dangerous object more intuitively.

As described above, in an embodiment of the present invention, a video display system performs a video conversion process on a video of a camera mounted on a vehicle and displays a resulting video, and includes a plurality of cameras, a detecting unit that detects an object of interest around a vehicle based on information or the like acquired through the plurality of cameras, other sensors, or a network, a transforming/synthesizing unit that transforms and synthesizes the videos photographed by the plurality of cameras using a shape of a virtual projection plane, a virtual viewpoint, and a synthesis method which are decided according to position information of the object of interest detected by the detecting unit, and a display unit that displays the video that is transformed and synthesized by the transforming/synthesizing unit.

Further, in an embodiment of the present invention, in a video display system that performs a video conversion process on a video of a camera mounted on a vehicle and displays a video that has undergone the video conversion process, a video obtained by performing transformation and synthesis on vides photographed by a plurality of cameras through a transforming/synthesizing unit using a shape of a virtual projection plane, a virtual viewpoint, and a synthesis method which are decided according to position information of an object of interest is set as a first synthesized video, and a second synthesized video obtained by performing transformation and synthesis on the videos photographed by the plurality of cameras in a state in which the virtual viewpoint is not changed even when the position information of the object of interest is changed is displayed on the display unit or a second display unit separate from the display unit, separately from the first synthesized video.

Further, in an embodiment of the present invention, a video display system performs a video conversion process on a video of a camera mounted on a vehicle and displays a video that has undergone the video conversion process, and includes one or more lights arranged in the vehicle and a blinking control unit that controls blinking of the lighting, and a notification of a position information of an object of interest detected by a detecting unit is given by a position at which the lighting blinks.

Further, in an embodiment of the present invention, a video display system performs a video conversion process on a video of a camera mounted on a vehicle and displays a video that has undergone the video conversion process, and includes one or more speakers arranged in the vehicle and a rumbling control unit that controls rumbling of the speaker, and a notification of a position information of an object of interest detected by a detecting unit is given by a position at which the speakers outputs a sound.

The present invention is not limited to the above embodiment, and various transformation examples are included. The above embodiment has been described in detail to facilitate understanding of the present invention, and the present invention is not limited to a configuration necessarily including all the components described above. Further, some components of a certain embodiment may be replaced with components of another embodiment. Further, components of another embodiment may be added to components of a certain embodiment. Furthermore, other components may be added to, deleted from, and replace some components of each embodiment.

All or some of the above components, functions, processing units, processing means, or the like may be implemented by hardware such that they are designed by, for example, as integrated circuit (IC). The above components, functions, or the like may be implemented by software by interpreting and executing a program of implementing the functions through a processor. Information such as a program, a table, or a file for implementing each function may be stored in a recording apparatus such as a memory, a hard disk, a solid state drive (SSD) or a recording medium such as an IC card, an SD card, or a DVD.

REFERENCE SIGNS LIST 100 video synthesis device
101 decoding unit
102 central processing unit (CPU)
103 memory
104 detecting unit
105 transforming/synthesizing unit
106 encoding unit
107 bus
110 imaging unit
110-1 to 110-4 camera
120 monitor
300 automobile

The invention claimed is:

1. A video synthesis device that transforms and synthesizes a plurality of videos input from a plurality of cameras and outputs a synthesized video to a video display, comprising:
   a detector, communicatively coupled to the plurality of cameras, that acquires position information related to an object of interest; and
   a processor, communicatively coupled to the detector, that transforms and synthesizes the plurality of videos photographed by the plurality of cameras,
   wherein the processor transforms and synthesizes a virtual projection state, the virtual projection state being one in which the videos photographed by the plurality of cameras are projected onto a virtual projection plane into a video, the virtual projection plane being a plane that is viewed from a virtual viewpoint in space set according to position information related to the object of interest, and
   the processor sets the virtual viewpoint at a position at which an angle difference between a line connecting a camera that images the object of interest among the plurality of cameras with a point that crosses the virtual projection plane and a line connecting the crossing point with the point in space defining the virtual viewpoint is smaller than a predetermined angle.

2. The video synthesis device according to claim 1, wherein the predetermined angle is decided so that distortion of a video of the object of interest in the synthesized image is minimized according to a distance between the object of interest and the camera that images the object of interest and a deviation amount between a projection position at which the object of interest is projected onto the virtual projection plane and a position of the object of interest.

3. The video synthesis device according to claim 1, wherein the virtual projection plane is configured with a plane that has the same height as a ground surface and is parallel to the ground surface and a spherical surface arranged at a position farther than the object of interest, and
the processor sets at least one of a center position of the spherical surface and a radius of the spherical surface so that the spherical surface of the virtual projection plane is arranged within a predetermined distance from a position of the object of interest when viewed from the camera that photographs the object of interest.

4. The video synthesis device according to claim 1, wherein the processor synthesizes the videos by blending videos obtained by transforming a virtual projection state in which the plurality of videos are switched at a blending position decided according to the position information related to the object of interest and projected onto the virtual projection plane into the videos viewed from the virtual viewpoint.

5. The video synthesis device according to claim 4, wherein the processor synthesizes,
when the object of interest exists in a region that is duplicatedly photographed by two neighboring cameras, the videos by blending videos obtained by setting the blending position so that the object of interest does not overlap the blending position and transforming the videos photographed by the two cameras.

6. The video synthesis device according to claim 1, wherein the object of interest is an object that is inferred based on information related to a speed of the vehicle with which the video synthesis device is equipped, information related to a steering angle, and information related to a traveling direction and exists in a direction having a possibility of a collision with the vehicle.

7. A video synthesis method of transforming and synthesizing videos input from a plurality of cameras and outputting a synthesized video to a video display unit, comprising:
acquiring, by a detector, position information related to an object of interest; and
transforming and synthesizing, by a processor communicatively coupled to the detector, the plurality of videos photographed by the plurality of cameras,
projecting, by the processor, a virtual projection state, the virtual projection state being one in which the videos photographed by the plurality of cameras are projected onto a virtual projection plane into a video, the virtual projection plane being a plane that is viewed from a virtual viewpoint in space set according to the position information related to the object of interest, and
setting, by the processor, the virtual viewpoint at a position at which an angle difference between a line connecting a camera that images the object of interest among the plurality of cameras with a point that crosses the virtual projection plane and a line connecting the crossing point with the point in space defining the virtual viewpoint is smaller than a predetermined angle.

8. The video synthesis method according to claim 7, wherein the predetermined angle is decided so that distortion of a video of the object of interest in the synthesized image is minimized according to a distance between the object of interest and the camera that images the object of interest and a deviation amount between a projection position at which the object of interest is projected onto the virtual projection plane and a position of the object of interest.

9. The video synthesis method according to claim 7, wherein the virtual projection plane is configured with a plane that has the same height as a ground surface and is parallel to the ground surface and a spherical surface arranged at a position farther than the object of interest, and setting, by the processor, at least one of a center position of the spherical surface and a radius of the spherical surface so that the spherical of the virtual projection plane is arranged within a predetermined distance from a position of the object of interest when viewed from the camera that photographs the object of interest.

10. The video synthesis method according to claim 7, synthesizing, by the processor, by blending videos obtained by transforming a virtual projection state in which the plurality of videos are switched at a blending position decided according to the position information related to the object of interest and projected onto the virtual projection plane into the videos viewed from the virtual viewpoint.

* * * * *